Jan. 17, 1933.   R. O. SHULTZ   1,894,714
BRAKE EQUALIZER
Filed Dec. 26, 1931

INVENTOR:
Reno O. Shultz
BY David E. Carlsen
ATTORNEY.

Patented Jan. 17, 1933

1,894,714

UNITED STATES PATENT OFFICE

RENO O. SHULTZ, OF MONTEVIDEO, MINNESOTA

BRAKE EQUALIZER

Application filed December 26, 1931. Serial No. 583,243.

My invention relates to brake equalizing devices for motor vehicles and the main object is to provide a highly efficient, mechanical equalizer particularly adapted for use on cars of the type having four wheel brakes. The construction and application of this device is such that under conditions where one or more of the brakes of a car for any reason becomes inoperative the remaining brakes will function. Further objects and advantages are hereinafter fully set forth, reference being had to the accompanying drawing, in which,—

Figure 1:
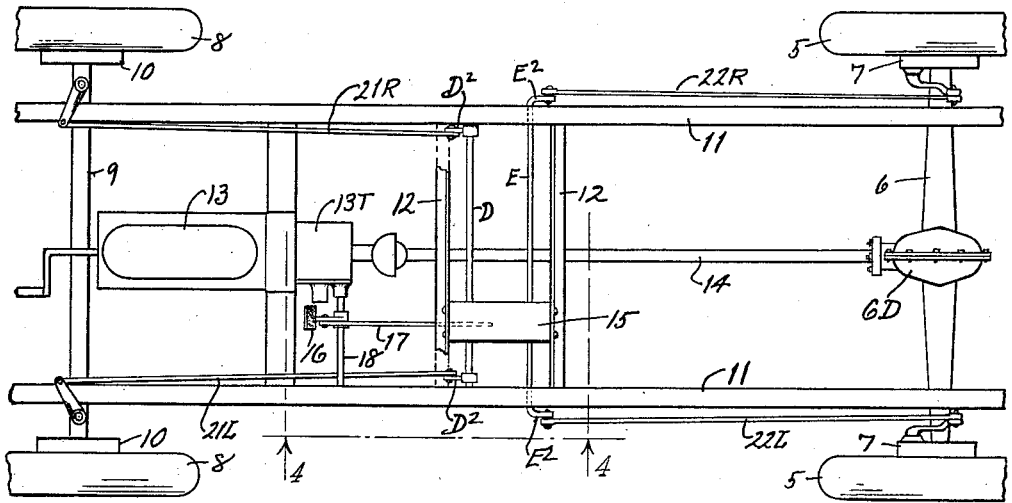
Fig. 1 is a diagrammatic plan view of the chassis of a motor vehicle with my improved equalizer in operative position.

Referring to the drawing by reference numerals, I have illustrated the chassis of a so-called pleasure car with four wheel brakes. 5 designates the rear wheels, 6 the axle thereof, 7 the brake drums, 8 the front wheels, 9 the front wheel axle and 10 the front brake drums. 11 designates the main longitudinal chassis or frame members normally spring mounted on the axles (not shown) and 12 are a pair of spaced cross frame members. 13 is the motor with the usual transmission housing 13T and 14 is the usual drive shaft to the differential 6D of the rear axle 6.

The main brake actuating mechanism of my device is mounted in a longitudinal housing 15 suitably mounted as between the frame members 12 and rearward of the usual foot brake pedal 16 from which a primary actuating rod 17 extends rearwardly into the housing 15. The pedal-lever 16 is mounted suitably as on a shaft 18 and rod 17 pivotally connected thereabove so that forward movement of the brake-lever 16 pulls rod 17 forwardly to apply the brakes. The rear end of rod 17 is pivotally connected at 19 within housing 15 to an upward integral extension of a differential pinion shaft 20 of a central differential B in the housing 15, there being three like differentials therein arranged longitudinally and designated respectively from front to rear as A, B and C and presently to be fully described.

21R and 21L are respectively the right and left front brake reach rods and 22R and 22L are the corresponding rear brake reach rods, extending longitudinally of the frame and toward the center part of the chassis where they are connected each to a rocker arm, the four of said rocker arms being on two transverse rock shafts of which the forward one is designated D and the rear one E. The rocker arms on said shafts are designated D2 and E2 respectively.

Each of the shafts D and E is made in two parts with adjacent inner ends within housing 15 and all said shaft parts oscillatable in bearings in the side walls of the housing. The said inner ends of shaft D carry each a gear 23 of differential A and between said pair of gears a pair of diametrically opposite differential pinions 24 mesh with said pair of gears, said pinions mounted on a common shaft 25 retained in a quadrangular yoke 26, the opposite sides of which inclose the gears and bear pivotally on the D shaft parts externally of the gears.

Figure 2:
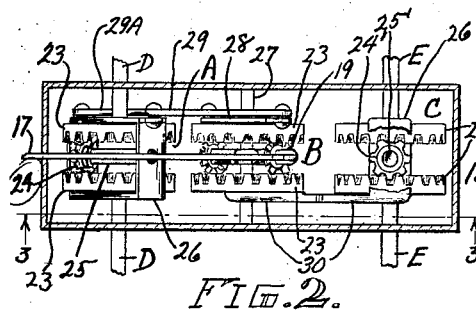
Fig. 2 is a top view, in enlarged scale, looking into the equalizer housing 15 of my device, the cover of said housing being omitted and the view being taken about as on line 2—2 in Fig. 3.
Figure 3:
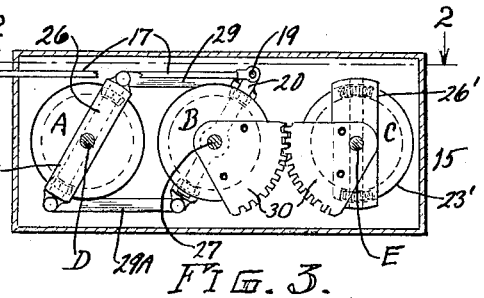
Fig. 3 is a vertical longitudinal elevation of the interior of the equalizer housing about as on line 3—3 in Fig. 2.

The center differential B has its pinions 24 rotatably fixed on the diametrical shaft or bar 20 which is loosely journaled on a differential shaft 27 fixed in the side walls of the housing. The reach rod 17, as previously stated, is pivotally connected to a projected upper end of bar 20. On the outer side of one gear 23 of differential B is fixed a diametrical bar 28 normally in parallel relation to the yoke 26 of differential A and connected to the latter by an upper link 29 and a lower link 29A (see Figs. 2 and 3). It will now be readily understood that reciprocation of rod 17 causes corresponding motion of differentials A and B. The same action also causes corresponding rotation of differential C by means of two meshing partial gears 30 fixed one on the outer side of a gear of differential B and the other fixed on yoke 26' but fulcrumed free on shaft E of differential C, said yoke 26' corresponding to yoke 26 of the front differential A. Pinions 24', shaft 25' and gears 23' correspond to like numbered parts of the front differential. This gear action between the center and rear differentials causes the depending outer brake arm E2 of shaft E to be swung forwardly simultaneously as the brake arms or levers D2 are swung rearwardly for proper direction of pull on the rear and forward reach rods 22R—22L and 21R—21L respectively.

Figure 4:
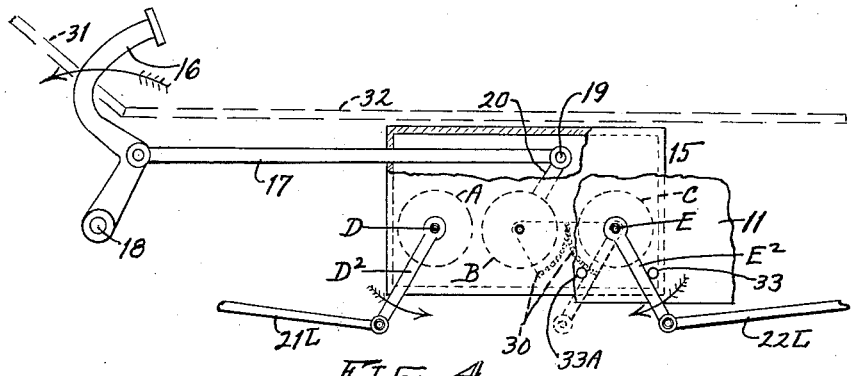
Fig. 4 is an enlarged detail side elevation of the central part of Fig. 1 about as on line 4—4, some of the auto main frame shown only fractionally and a portion of the equalizer housing broken out to reveal certain details.

In Fig. 4 the brake pedal 16, pull rod 17 and relative locations of the differentials and the brake levers E2 and D2 are shown in approximately correct proportions and relation. 31 designates the foot board of a car through which the foot pedal projects upwardly, and 32 designates the car floor. 33 and 33A designate studs or an equivalent thereof, fixed in the frame member 11 in such positions as to limit rearward and forward movement respectively of lever arm E2. These means are also provided (not shown) for the other three lever arms E2 and D2.

In the use of my device the above description fully reveals the positive brake action simultaneously on all four brake rods. Inequalities of brake action on the 4 wheel drums due to wear of brake lining, etc., is compensated by the differentials, the braking action remaining practically constant in effect on the brakes that are not defective. With the three differentials described, actuated through the center differential a balance of power is available and effective braking positively assured. For example, if the rear left brake is only partly effective its pull lever E2 still functions and although it may not cause braking action when said lever E2 has reached its foremost position (shown dotted in Fig. 4) the action of differentials C and A still provide uniform and positive brake action to the other three brakes. This condition is equally true if two or more brakes are not functioning properly. However, it is now clear that effective braking is available even if one or more brakes are defective which comprises an important feature inasmuch as no temporary repairs or adjustments need be made on the road.

My device is applicable to practically all 4-wheel brake cars either as an applied accessory or built into motor vehicles at the factory.

I claim:

1. A brake equalizer device for a motor vehicle with four wheel brakes, brake means including a lever at each brake drum, reach rods extending from said levers, and a transverse rock shaft for each pair of said brake rods; footpedal operated means arranged to oscillate said rock shafts and operate the brakes simultaneously; a longitudinal mechanism housing mounted near said foot pedal, three differentials in said housing and means connecting said differentials to each other and the forward differential to the foot brake to cause simultaneous oscillation of the differentials, said rock shafts arranged one forward of the other, both shafts two-part and fixed in respective opposite gears of the front and rear differentials, a pair of meshing mutilated gears connecting the center differential rotatably to the rear differential, reach rod members operatively connecting the forward with the center differential and reach rod means connecting the forward differential with the brake foot pedal.

2. The structure specified in claim 1, in which each of the differentials is provided with a pair of differential pinions mounted on a diametrical shaft, both said shafts extended beyond their pinion bearings and said reach rod means comprising a pair of parallel bars, one above and one below and connecting the forward and central differential pinion shafts.

3. A brake equalizing device for vehicles having four wheel brakes and reciprocable reach rod means extending in pairs from the front and rear wheel brakes toward the center of the vehicle, a pair of rock shafts extending transversely of the car body and each formed at its ends with a lever arm connected to one of said reach rods; said equalizing device comprising a mechanism housing mounted longitudinally in the vehicle frame, three differentials mounted in said housing in spaced alinement, the front transverse rockshaft comprising the front differential shaft and the rear rock shaft the corresponding shaft of the rear differential, the center differential mounted rotatably intermediate the front and rear differentials, and link means connecting the forward and the intermediate differentials to provide like rotary movement of them in unison, mutilated gears mounted on the shafts of the rear and center differentials and meshing to provide rotation of the rear differential in a direction opposite to the direction of rotation of the center differential, said opposite movement of the front and rear differentials to cause swinging of the respective rock shaft arms to pull their respective brake rods as required.

In testimony whereof I affix my signature.

RENO O. SHULTZ.